(12) United States Patent
Zong et al.

(10) Patent No.: US 12,154,496 B2
(45) Date of Patent: Nov. 26, 2024

(54) DISPLAY PANEL, DISPLAY APPARATUS, AND DRIVING METHOD

(71) Applicants: BOE MLED Technology Co., Ltd., Beijing (CN); BOE Technology Group Co., Ltd., Beijing (CN)

(72) Inventors: Shaolei Zong, Beijing (CN); Jigang Sun, Beijing (CN); Rui Liu, Beijing (CN); Xin Duan, Beijing (CN); Wei Sun, Beijing (CN); Junwei Zhang, Beijing (CN); Hongrun Wang, Beijing (CN); Fuqiang Li, Beijing (CN); Changfeng Sun, Beijing (CN); Hui Zhang, Beijing (CN); Xue Dong, Beijing (CN)

(73) Assignees: BOE MLED TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/270,850

(22) PCT Filed: Feb. 26, 2021

(86) PCT No.: PCT/CN2021/078089
§ 371 (c)(1),
(2) Date: Jul. 4, 2023

(87) PCT Pub. No.: WO2022/178811
PCT Pub. Date: Sep. 1, 2022

(65) Prior Publication Data
US 2024/0304139 A1    Sep. 12, 2024

(51) Int. Cl.
*G09G 3/3225*    (2016.01)
*G09G 3/20*    (2006.01)
(Continued)

(52) U.S. Cl.
CPC ......... *G09G 3/3225* (2013.01); *G09G 3/2092* (2013.01); *G09G 3/3648* (2013.01);
(Continued)

(58) Field of Classification Search
CPC .. G09G 3/3225; G09G 3/2092; G09G 3/3648; G09G 2300/0452;
(Continued)

(56) References Cited

U.S. PATENT DOCUMENTS 10,395,589 B1 *   8/2019   Vahid Far ............ G09G 3/3208
2010/0309100 A1 *   12/2010   Cok ...................... G09G 3/3208
345/76

(Continued)

FOREIGN PATENT DOCUMENTS

CN    109885176 A    6/2019
CN    110111738 A    8/2019

(Continued)

OTHER PUBLICATIONS

PCT/CN2021/078089 international search report.

*Primary Examiner* — Mihir K Rayan
(74) *Attorney, Agent, or Firm* — IPro, PLLC

(57) ABSTRACT

Disclosed are a display panel, a display device and a driving method. The display panel includes a plurality of sub-pixel units located in areas formed by the plurality of scanning signal lines and the plurality of data signal lines, and at least two adjacent sub-pixel units in the first direction and the second direction constitute a pixel island. A plurality of control units each corresponding to a sub-pixel unit row in the pixel island are provided. The control unit includes a control terminal, an input terminal and an output terminal. The control unit is configured to transmit a signal from the input terminal to the output terminal under control of a first signal transmitted by a control signal line corresponding to the control unit, and stop transmitting the signal from the input terminal to the output terminal under control of a second signal transmitted by the control signal line.

15 Claims, 8 Drawing Sheets

(51) Int. Cl.
*G09G 3/36* (2006.01)
*H04N 23/611* (2023.01)
*H04N 23/67* (2023.01)

(52) U.S. Cl.
CPC ......... *H04N 23/611* (2023.01); *H04N 23/675* (2023.01); *G09G 2300/0452* (2013.01); *G09G 2300/0842* (2013.01); *G09G 2340/0435* (2013.01)

(58) Field of Classification Search
CPC ... G09G 2300/0842; G09G 2300/0435; H04N 23/611; H04N 23/675
See application file for complete search history.

(56) References Cited

U.S. PATENT DOCUMENTS

| | | |
|---|---|---|
| 2011/0234564 A1 | 9/2011 | Kim et al. |
| 2012/0169580 A1 | 7/2012 | Nishi et al. |
| 2021/0272517 A1 | 9/2021 | Chen et al. |
| 2022/0122519 A1* | 4/2022 | Bower .................. H01L 25/167 |
| 2022/0311991 A1 | 9/2022 | Hong |
| 2023/0005442 A1* | 1/2023 | Huang .................. G09G 3/3208 |
| 2023/0055746 A1* | 2/2023 | Ozbas .................. G09G 3/3426 |

FOREIGN PATENT DOCUMENTS

| | | |
|---|---|---|
| CN | 110189679 A | 8/2019 |
| CN | 110632767 A | 12/2019 |
| WO | 2011033822 A1 | 3/2011 |

* cited by examiner

DISPLAY PANEL, DISPLAY APPARATUS, AND DRIVING METHOD

CROSS REFERENCE TO RELATED APPLICATIONS

This application is a national phase entry under 35 U.S.C. § 371 of International Application No. PCT/CN2021/078089, filed on Feb. 26, 2021, the entire content of which is incorporated herein by reference.

TECHNICAL FIELD

The present disclosure relates to the technical field of display, in particular to a display panel, a display device and a drive method.

BACKGROUND

As the display industry evolves, especially in specific display scenarios such as virtual reality (VR), augmented reality (AR), immersive gaming and racing sports, users are becoming more demanding in terms of display quality, including but not limited to screen refresh rate and high resolution.

Conventional display refresh rates often cause motion blur, ghosting, low resolution, etc. However, increase in the display refresh rate and resolution is likely to result in multiplying of display transmission data and further increase the number of data transmission interfaces, data transmission bandwidth and power consumption of the display device. As a result, immersive experience of the users in the display device will be seriously affected.

SUMMARY

In a first aspect of an embodiment of the present disclosure, a display panel is provided. The display panel includes: a substrate; a plurality of scanning signal lines disposed on the substrate, where the plurality of scanning signal lines extend in a first direction and are arranged in a second direction, and the first direction and the second direction intersect; a plurality of data signal lines disposed on the substrate, where the plurality of data signal lines extend in the second direction and are arranged in the first direction; a plurality of sub-pixel units located in areas formed by the plurality of scanning signal lines and the plurality of data signal lines respectively, where at least two adjacent sub-pixel units in the first direction and the second direction constitute a pixel island; a plurality of control units located between adjacent pixel islands in the first direction, where one pixel island is correspondingly connected with n control units, n represents the number of sub-pixel unit rows includes in the pixel island in the second direction, and one control unit corresponds to one row of sub-pixel units in the pixel island in the first direction; and a plurality of control signal lines located between the adjacent pixel islands in the first direction respectively, where the plurality of control signal lines extend in the second direction and are arranged in the first direction. The sub-pixel unit comprises a first transistor and a drive circuit, a first electrode of the first transistor is connected with a data signal line corresponding to a sub-pixel unit column comprising the sub-pixel unit, a second electrode of the first transistor is connected with the drive circuit in the sub-pixel unit, and a control electrode of the first transistor is connected with control electrodes of first transistors of sub-pixel units located in a same row in the first direction in the pixel island; the control unit comprises a control terminal, an input terminal and an output terminal, the control terminal of the control unit is connected with a control signal line corresponding to the control unit, the input terminal of the control unit is connected with a scanning signal line corresponding to the control unit, and the output terminal of the control unit is connected with control electrodes of first transistors in a sub-pixel unit row corresponding to the control unit; and the control unit is configured to transmit a signal from the input terminal to the output terminal under control of a first signal transmitted by the control signal line, and stop transmitting the signal from the input terminal to the output terminal under control of a second signal transmitted by the control signal line.

In some embodiments of the present disclosure, the control unit includes: a second transistor and a third transistor, and the display panel further includes: a plurality of fixed potential signal lines located between adjacent sub-pixel units in the second direction respectively, and the plurality of fixed potential signal lines extend in the first direction and are arranged in the second direction; a control electrode of the second transistor is connected with the control signal line corresponding to the control unit, a first electrode of the second transistor is connected with the scanning signal line corresponding to the control unit, and a second electrode of the second transistor is connected with control electrodes of first transistors in the sub-pixel unit row corresponding to the control unit; a control electrode of the third transistor is connected with the control signal line corresponding to the control unit, a first electrode of the third transistor is connected with a fixed potential signal line corresponding to the control unit, and a second electrode of the third transistor is connected with the control electrodes of the first transistors in the sub-pixel unit row corresponding to the control unit; and the control unit is configured to transmit a signal from the input terminal to the output terminal under control of a first signal transmitted by the control signal line, and stop transmitting the signal from the input terminal to the output terminal under control of a second signal transmitted by the control signal line.

In some embodiments of the present disclosure, the second transistor is an N-type transistor, the third transistor is a P-type transistor, the first signal is a high-level signal, and the second signal is a low-level signal. Or, the second transistor is a P-type transistor, the third transistor is an N-type transistor, the first signal is a low-level signal, and the second signal is a high-level signal.

In some embodiments of the present disclosure, the control unit includes: a second transistor and a third transistor, the control signal line is a first control signal line, and the display panel further includes: a plurality of second control signal lines located between the adjacent pixel islands in the first direction respectively, and the plurality of second control signal lines extend in the second direction and are arranged in the first direction; and a plurality of fixed potential signal lines located between adjacent sub-pixel units in the second direction respectively, and the plurality of fixed potential signal lines extend in the first direction and are arranged in the second direction. A control electrode of the second transistor is connected with the first control signal line corresponding to the control unit, a first electrode of the second transistor is connected with the scanning signal line corresponding to the control unit, and a second electrode of the second transistor is connected with control electrodes of first transistors in the sub-pixel unit row corresponding to the control unit; a control electrode of the third transistor is connected with a second control signal line corresponding to the control unit, a first electrode of the third transistor is connected with a fixed potential signal line corresponding to the control unit, and a second electrode of the third transistor is connected with the control electrodes of the first transistors in the sub-pixel unit row corresponding to the control unit; the second transistor is configured to be turned on under control of the first signal transmitted by the first control signal line, and to be turned off under control of the second signal transmitted by the first control signal line; and the third transistor is configured to be turned on under control of a third signal transmitted by the second control signal line, and to be turned off under control of a fourth signal transmitted by the second control signal line.

In some embodiments of the present disclosure, the second transistor is an N-type transistor, the first signal is a high-level signal, and the second signal is a low-level signal; or, the second transistor is a P-type transistor, the first signal is a low-level signal, and the second signal is a high-level signal. The third transistor is an N-type transistor, the third signal is a high-level signal, and the fourth signal is a low-level signal; or, the third transistor is a P-type transistor, the third signal is a low-level signal, and the fourth signal is a high-level signal.

In some embodiments of the present disclosure, the first transistor is an N-type transistor, and the fixed potential signal line is configured to transmit the low-level signal. Or, the first transistor is the P-type transistor, and the fixed potential signal line is configured to transmit the high-level signal.

In some embodiments of the present disclosure, the display panel is a liquid crystal display panel or an organic light-emitting diode display panel.

In some embodiments of the present disclosure, display colors of sub-pixel units in a pixel island are same; and the display panel comprises a plurality of pixel islands, and the plurality of pixel islands at least comprise a first pixel island for displaying a first color and a second pixel island for displaying a second color.

In a second aspect of the embodiment of the present disclosure, a display device is provided. The display device includes any display panel above, a microlens layer and a controller. The microlens layer is disposed on a light emitting side of the display panel, the microlens layer comprises a plurality of microlenses corresponding to pixel islands of the display panel, and the microlens is configured to modulate emergent light of the pixel island in the display panel, to cause the pixel island to be mapped into a pixel array and realize image display; and the controller is connected with the display panel and configured to provide a drive signal for the display panel.

In some embodiments of the present disclosure, the display device further includes: a camera arranged at a bezel area of the display device, where the camera is configured to photograph eyes of an user, to cause the controller to determine a focus area of the user on the display device according to a shot image, and drive the focus area and a non-focus area in the display panel to refresh at different refresh rates for image display.

In a third aspect of the embodiment of the present disclosure, a drive method based on the display device above. The drive method includes: determining a focus area and a non-focus area of a user on the display device in real time; and driving the focus area to refresh at a first refresh rate for image display, and driving the non-focus area to refresh at a second refresh rate for image display, wherein the first refresh rate is higher than the second refresh rate.

In some embodiments of the present disclosure, the display device includes a camera; and the determining the focus area and the non-focus area of the user on the display device in real time includes: controlling the camera to photograph eyes of the user in real time; determining the focus area of the user on the display device according to a shot image; and determining a remaining area on the display device except the focus area as the non-focus area.

In some embodiments of the present disclosure, the driving the focus area to refresh at the first refresh rate for image display, and driving the non-focus area to refresh at the second refresh rate for image display, includes: driving sub-pixel units in the focus area to refresh a times; and driving sub-pixel units in the non-focus area to refresh b times; where a and b are positive integers, and a is greater than b.

In some embodiments of the present disclosure, the driving the focus area to refresh at the first refresh rate for image display, and driving the non-focus area to refresh at the second refresh rate for image display, includes: driving sub-pixel units in the focus area to refresh c times; and driving the sub-pixel units in the focus area and sub-pixel units in the non-focus area to refresh d times; where c and d are positive integers.

In some embodiments of the present disclosure, the driving sub-pixel units in the focus area to refresh includes: driving scanning signal lines corresponding to the focus area to sequentially transmit active level signals; and controlling control signal lines corresponding to the focus area to transmit a first signal, and controlling control signal lines corresponding to the non-focus area to transmit a second signal. The driving sub-pixel units in the non-focus area to refresh includes: driving scanning signal lines in a display panel to sequentially transmit active level signals; and while sub-pixel unit rows corresponding to the focus area are scanned, controlling the control signal lines corresponding to the focus area to transmit the second signal, and controlling the control signal lines corresponding to the non-focus area to transmit the first signal.

BRIEF DESCRIPTION OF FIGURES

In order to describe technical solutions in embodiments of the present disclosure more clearly, accompanying drawings required by the embodiments of the present disclosure will be briefly described below. Apparently, the accompanying drawings in the following description are merely some embodiments of the present disclosure, and a person of ordinary skill in the art can further derive other accompanying drawings from these accompanying drawings without creative efforts.

In the figures.

Figure 1:
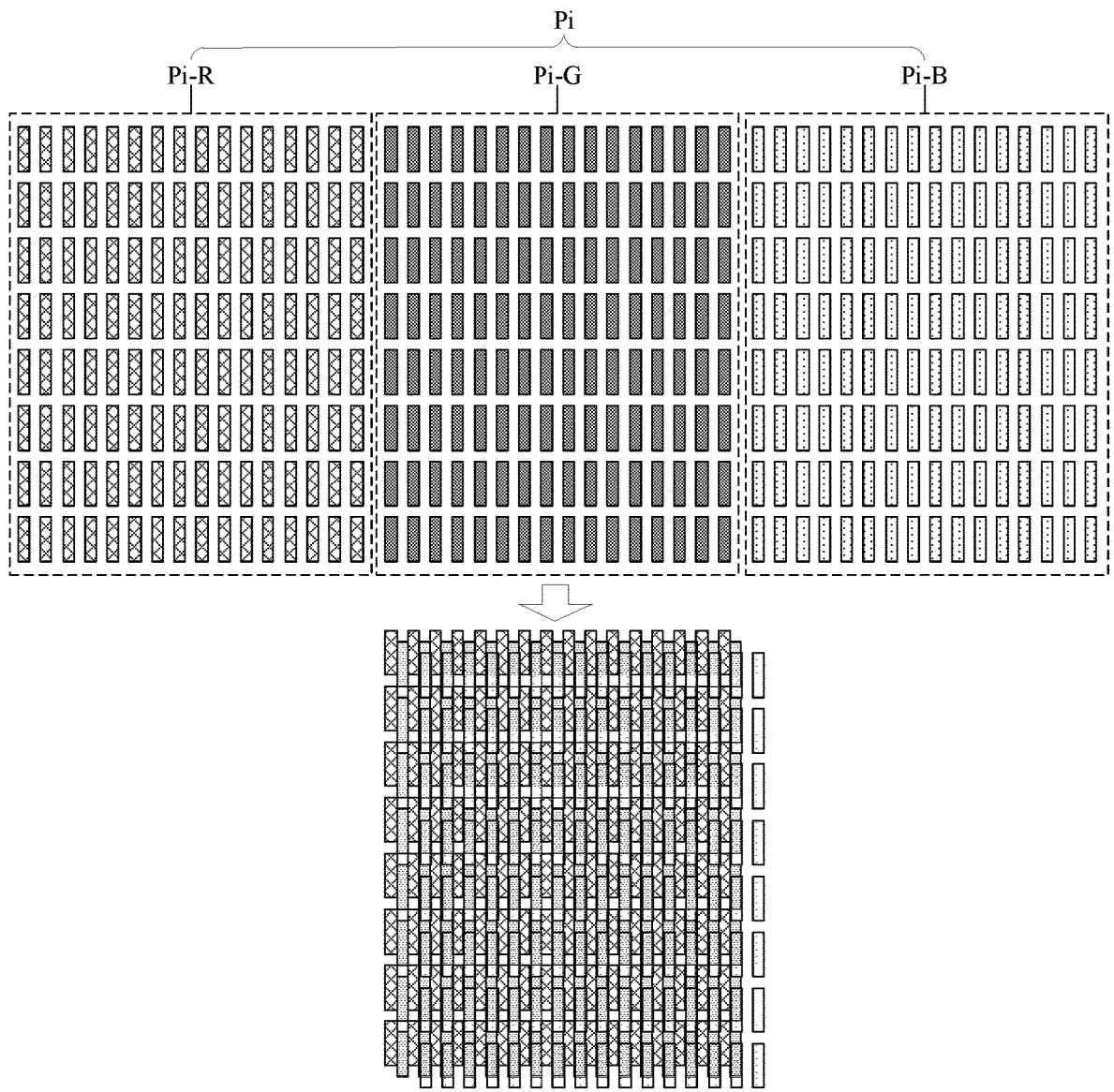
FIG. 1 is a schematic diagram of a planar structure of a pixel island according to an embodiment of the present disclosure.

10: substrate, 20: scanning signal line, 30: data signal line, 40: control signal line, 41: first control signal line, 42: second control signal line, 50: fixed potential signal line, 100: display panel, 200: microlens layer, 300: controller, Pi: pixel island, Pi-R: first pixel island, Pi-G: second pixel island, Pi-B: third pixel island, p: sub-pixel unit, c: control unit, T1: first transistor, T2: second transistor, T3: third transistor, and dr: drive circuit.

DETAILED DESCRIPTION

In order to make the above objective, features, and advantages of the present disclosure clearer and more comprehensible, the present disclosure will be further described below in conjunction with accompanying drawings and embodiments. However, illustrative implementation modes can be implemented in many forms and should not be constructed as being limited to the implementation modes set forth herein; but instead, these implementation modes are provided to make the present disclosure more thorough and complete, and fully convey the concept of illustrative implementation modes to those skilled in the art. In the accompanying drawings, the same reference numerals indicate the same or similar structures, and their repeated description will be omitted as a result. The words expressing positions and directions described in the present disclosure are all described with the accompanying drawings as examples, but can also be modified according to needs, and all modifications shall fall within the protection scope of the present disclosure. The accompanying drawings of the present disclosure are merely used for illustrating relative positional relations rather than representing true proportions.

At present, display screens commonly used include a liquid crystal display (LCD) and an organic light-emitting diode (OLED) display screen.

As a mainstream display at present, the liquid crystal display features low power consumption, small sizes, low radiation, etc. A liquid crystal display panel is a non-self-luminous panel and must be used with a backlight module.

The LCD is mainly composed of the backlight module and the liquid crystal display panel. The LCD panel itself does not emit light, and the backlight module provides light source for brightness display.

In LCD, a layer of liquid crystal is placed between two conductive glass sheets, the orientation of the molecules in the liquid crystal layer can be changed by the electric field created by the driving voltages applied to the two conductive glass sheets, so as to control the backlight to be transmitted or blocked, thereby realising the image display. If a color filter is added, a color image may be displayed.

The OLED display is known as an organic electroluminesence display or an organic light-emitting semiconductor display. Since the OLED display screen is a self-luminescence display screen, a backlight module is not required, and an overall thickness of the device is small, which is conducive to miniaturization of a near-eye display device and more conducive to mounting of the whole machine.

A light-emitting device in the OLED display screen is an OLED component. The OLED component is a current-type organic light-emitting device, emits light through injection and recombination of carriers, and has a luminous intensity directly proportional to injected currents.

Under the action of an electric field, holes generated by anode of the OLED and electrons generated by cathode will move to be injected into a hole transport layer and an electron transport layer respectively, and migrate to a luminescent layer. When the holes and the electrons meet in the luminescent layer to generate energy excitons, which excite photons and finally generate visible light.

No matter what kind of display screen is used, the display panel includes sub-pixel units arranged in an array. The more sub-pixel units included per unit size are, the higher pixels per inch (PPI) of the display panel are, and display details of a picture can be enriched accordingly. However, the sub-pixel units cannot be minimised indefinitely with the current technology, and there is a limit to the PPI of a display panel that can be produced using traditional technology. The embodiments of the present disclosure introduce a pixel island design and provide a normal display image after optical path integration by adding an optical microlens above the pixel island, in order to solve the problem of the art bottleneck limitation.

FIG. 1 is a schematic diagram of a planar structure of a pixel island according to an embodiment of the present disclosure.

As shown in FIG. 1, insufficient process accuracy of a sub-pixel unit mask limits the display PPI of an LCD or OLED panel. Therefore, the embodiment of the present disclosure may arrange a plurality of pixel islands Pi in the display panel, and one pixel island PI includes a plurality of sub-pixel units. Three pixel islands Pi are shown in FIG. 1 for illustrating a mapping relation of the sub-pixel units through an optical microlens. In an actual application, the display panel may include a plurality of pixel islands distributed in an array, and the specific number of pixel islands included in the display panel is not limited in the embodiment of the present disclosure.

As shown in FIG. 1, the pixel island Pi includes a plurality of sub-pixel units, and in the embodiment of the present disclosure, display colors of sub-pixel units in the same pixel island display are the same. In order to achieve color display, and the plurality of pixel islands Pi at least include a first pixel island displaying a first color and a second pixel island displaying a second color.

With FIG. 1 as an example, the pixel island Pi includes a first pixel island Pi-R displaying red, a second pixel island Pi-G displaying green, and a third pixel island Pi-B displaying blue. Each pixel island Pi includes 8 rows×16 columns of sub-pixel units. When at least one microlens array is arranged on a light emitting side of each pixel island Pi, light from the three pixel islands can be directed in a specific direction, such that the light from the three pixel islands may be mapped to the same position and forms a display block as shown in the bottom of FIG. 1. For example, adjacent 2 rows×2 columns of sub-pixel units in the pixel island Pi are used to display a pixel point, then 2 rows×2 columns sub-pixel units in the same positions in three pixel islands Pi can be mapped to the same position after being modulated by microlenses at the light emitting side for forming a pixel point. This pixel point includes brightness information of red, green and blue, and can be displayed as a color pixel point. A frame of image is composed of a plurality of the pixel points above, such that mapping of emergent light of the pixel island is performed by using the microlens array to implement image display.

The sub-pixel units of three colors are designed according to a first pixel island, a second pixel island and a third pixel island, and a plurality of sub-pixel units with the same color can be formed in each pixel island, such that a requirement for mask technology accuracy can be reduced, and even when the physical arrangement of the sub-pixel units reaches its limit, the display resolution can be improved.

Besides, the microlens array not only can be used for pixel mapping of the sub-pixel units in the pixel island, but also can modulate the emergent light from the pixel island, such that final emergent light from the pixel island forms a plurality of viewpoints, and three-dimensional image display is implemented.

Figure 2:
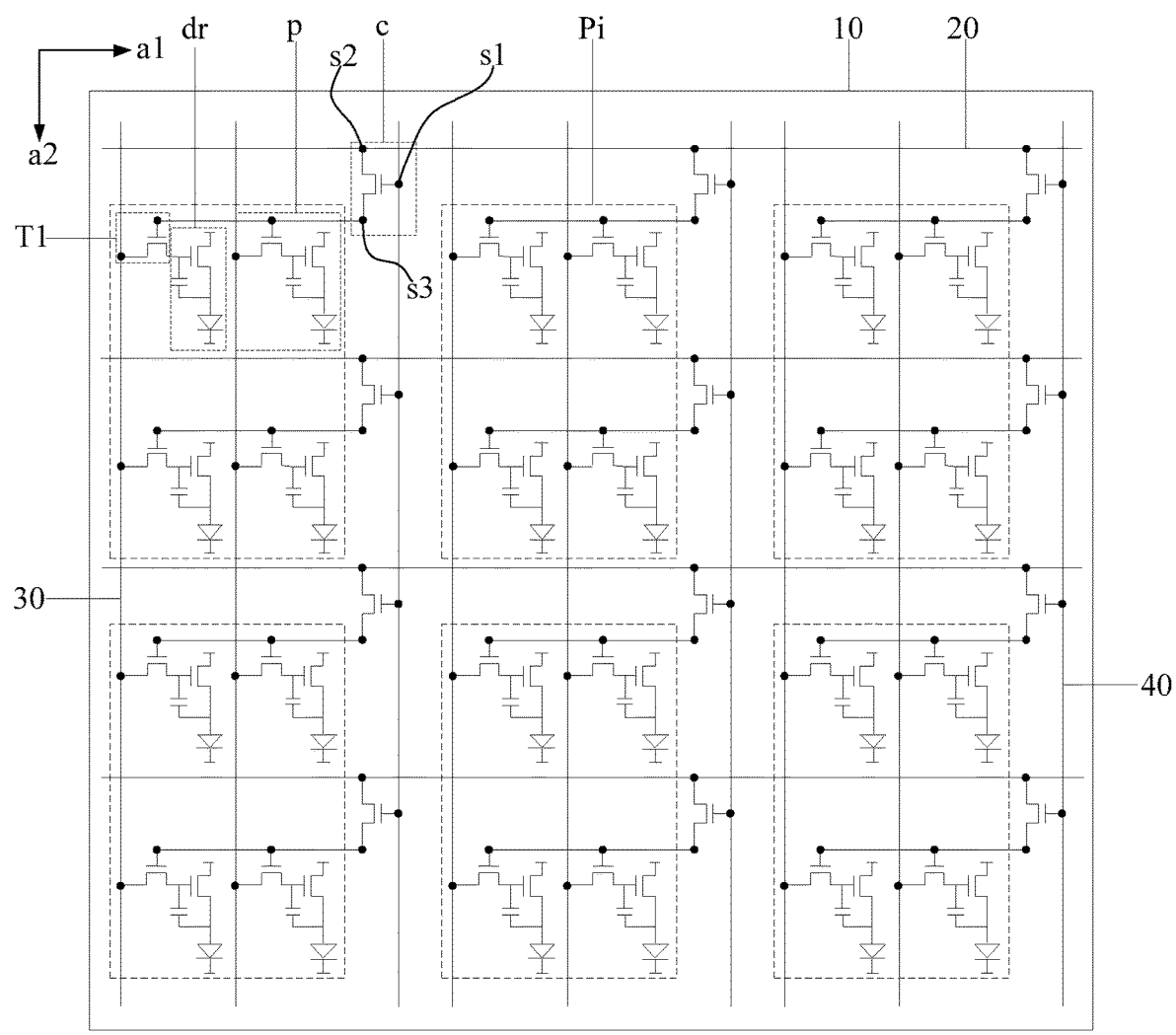
FIG. 2 is a first schematic diagram of a planar structure of a display panel according to an embodiment of the present disclosure.

The embodiment of the present disclosure provides a display panel based on the pixel island. FIG. 2 is a first schematic diagram of a planar structure of a display panel according to an embodiment of the present disclosure.

As shown in FIG. 2, the display panel includes a substrate 10 configured for supporting and bearing. The substrate 10 is usually made of a glass substrate. When the display panel is a flexible display panel, the substrate 10 may also be made of a flexible substrate, which is not limited herein.

A plurality of scanning signal lines 20 are disposed on the substrate 10, and the plurality of scanning signal lines 20 extend in a first direction a1 and are arranged in a second direction a2. The first direction a1 and the second direction a2 intersect. The first direction may be a direction of a sub-pixel unit row, and the second direction may be a direction of a sub-pixel unit column.

A plurality of data signal lines 30 are disposed on the substrate 10, and the plurality of data signal lines 30 extend in the second direction a2, and are arranged in the first direction a1. The plurality of scanning signal lines 20 and the plurality of data signal lines 30 intersect with each other to form a plurality of areas, and these areas are areas where sub-pixel units are located.

A plurality of sub-pixel units p are located in the areas formed by the plurality of scanning signal lines 20 and the plurality of data signal lines 30 respectively, and the plurality of sub-pixel units p are arranged in an array in the first direction a1 and the second direction a2. Each sub-pixel unit P is connected with a scanning signal line 20 corresponding to a sub-pixel row where the sub-pixel unit P is located and a data signal line 30 corresponding to a sub-pixel column where the sub-pixel unit P is located.

When a scanning signal line 20 transmits an active level, data signals can be written to a corresponding sub-pixel unit row, such that the sub-pixel unit row can implement image display according to the written data signal.

In the embodiment of the present disclosure, at least two adjacent sub-pixel units p in the first direction a1 and the second direction a2 constitute a pixel island. With FIG. 2 as an example, adjacent 2 rows×2 columns of sub-pixel units form one pixel island Pi for simplifying description according to the present disclosure. In an actual application, a pixel island at least includes two sub-pixel units. Besides, more sub-pixel units may be used to form a pixel island Pi. The specific number of sub-pixel units in one pixel island Pi is not limited in the embodiment of the present disclosure.

In the embodiment of the present disclosure, data signals applied to each sub-pixel unit in one pixel island Pi may be the same or not, thereby switching the display resolution. For example, when all sub-pixel units in one pixel island are provided with the same data signal, one pixel island is displayed as one pixel point, and the display resolution in this case is the lowest. When sub-pixel units in one pixel island are provided with data signals different from one another, one pixel island is displayed as the largest number of pixel points, and display resolution in this case is the highest. When the number of pixels displayed by one pixel island is greater than 1 and less than m, where m represents the number of sub-pixel units in one pixel island, the sub-pixel units in the pixel island are divided into groups, and at least two adjacent sub-pixel units are grouped as one group, and the number of groups is the number of pixel points finally displayed. When sub-pixel units in one group are provided with the same data signal, but different groups are provided with different data signals, image display in considerable resolution can be implemented.

In this case, by controlling data signals applied to the data signal lines 30, the number of pixel points that can be displayed by the pixel island can be controlled, thereby implementing different display resolutions.

On this basis, the display panel further includes: a plurality of control units c located between adjacent pixel islands Pi in the first direction a1, where one pixel island Pi is correspondingly connected with n control units, n represents the number of rows of sub-pixel units included in the pixel island Pi in the second direction a2, and one control unit c corresponds to one row of sub-pixel units p in the pixel island Pi.

A plurality of control signal lines 40 are located between the adjacent pixel islands in the first direction a1, where the plurality of control signal lines 40 extend in the second direction a2 and are arranged in the first direction a1.

As shown in FIG. 2, the sub-pixel unit p includes a first transistor T1 and a drive circuit dr, a first electrode of the first transistor T1 is connected with a data signal line 30 corresponding to a column of the sub-pixel units including the sub-pixel unit p, and a second electrode of the first transistor T1 is connected with the drive circuit dr in the sub-pixel unit p; and a control electrode of the first transistor is connected with control electrodes of first transistors T1 of sub-pixel units p located in the same row in the pixel island.

The control unit c includes a control terminal s1, an input terminal s2 and an output terminal s3, the control terminal s1 of the control unit c is connected with a control signal line 40 of a corresponding column of sub-pixel units, the input terminal s2 of the control unit c is connected with a scanning signal line 20 of a corresponding row of sub-pixel units, and the output terminal s3 of the control unit c is connected with control electrodes of first transistors T1 of sub-pixel units p in a row of sub-pixel units corresponding to the control unit c.

The control unit c is configured to transmit a signal from the input terminal s2 to the output terminal s3 under control of a first signal transmitted by the control signal line 40, and stop transmitting the signal from the input terminal s2 to the output terminal s3 under control of a second signal transmitted by the control signal line 40.

In the embodiment of the present disclosure, n control units c are correspondingly arranged to be in connection with each pixel island Pi, and each row of sub-pixel units of the pixel island Pi is correspondingly connected with one control unit c, such that the number of control units c connected with one pixel island Pi is equal to the number of rows of sub-pixel unit in the pixel island Pi.

With FIG. 2 as an example, one pixel island Pi may include 4 sub-pixel units in 2 rows×2 columns, a first row of sub-pixel units in the pixel island Pi is connected with one control unit c, and a second row of sub-pixel units in the pixel island Pi is connected with one control unit c. The control unit c is controlled to be turned on or off by the control signal line 40 connected with it.

When the control signal line 40 connected with the pixel island transmits the first signal, the control unit c connected with the first row of sub-pixel units and the control unit c connected with the second row of sub-pixel units are turned on under control of the first signal. In this case, the control unit c connected with the first row of sub-pixel units may provide a signal transmitted by a first row of scanning signal lines 20 to the first row of sub-pixel units, and the control unit connected with the second row of sub-pixel units provides a signal transmitted by a second row of scanning signal lines 20 to the second row of sub-pixel units. Since the scanning signal lines 20 sequentially output active level signals, if the first row of scanning signal line 20 transmits the active level signal, the first transistors T1 of the first row of sub-pixel units are turned on, and data signals provided by the data signal lines 30 are written to the first row of sub-pixel units. After scanning of the first row of sub-pixel units is completed, the scanning signal line 20 corresponding to the second row of sub-pixel units transmits the active level signal, and data signals may be written to the second row of sub-pixel units according to the same rule as above.

When the control signal line 40 connected with the pixel island transmits the second signal, the control unit c connected with the first row of sub-pixel units and the control unit c connected with the second row of sub-pixel units are turned off under control of the second signal. In this case, signals transmitted by the scanning signal lines 20 connected with the first row of sub-pixel units and the second row of sub-pixel units may not be transmitted to the first transistors T1 of a corresponding row of sub-pixel units through the control unit c. In this case, data signals may not be written to the first row of sub-pixel units or the second row of sub-pixel units.

As a result, by arranging the control signal line 40 and the control unit c in the display panel, and in combination with the control timing of the pixel island, the sub-pixel unit rows in one pixel island can be controlled independently relative to sub-pixel unit rows in another pixel island. Based on this, the display panel may be divided into display areas based on images, and the image can be refreshed separately in the important display area, or the area where the human eye focuses, and in other display areas. The important display area or the focus area may have a refresh rate that is N times as high as refresh rates of other display areas. While the important display area is driven at high resolution, a high refresh rate and a high response speed, for other display areas, transmission data may be compressed, and display resolution and a refresh rate may be reduced, such that limited resources can be preferentially allocated to the important display area, and the limitation problems such as a high data transmission bandwidth, high equipment power consumption and insufficient pixel charging are solved.

As shown in FIG. 2, the control unit c may be one transistor, a control electrode of the transistor is connected with the control signal line 40, a first electrode is connected with a scanning signal line 20 of a corresponding row of sub-pixel units, and a second electrode is connected with control electrodes of first transistors T1 in a corresponding row of sub-pixel units.

Figure 3:
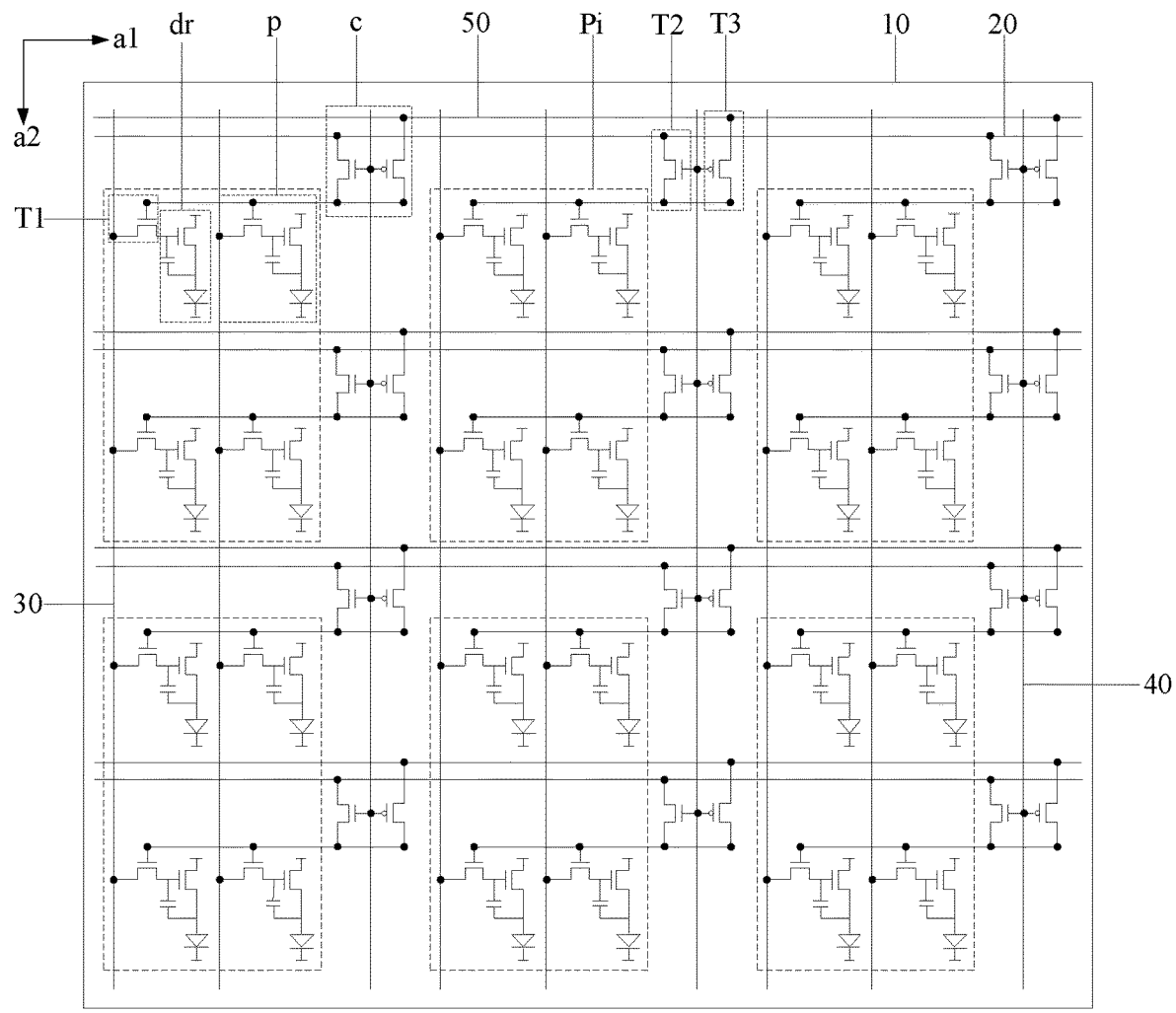
FIG. 3 is a second schematic diagram of a planar structure of a display panel according to an embodiment of the present disclosure.

In addition, the control unit c may also use other structures. FIG. 3 is a second schematic diagram of a planar structure of a display panel according to an embodiment of the present disclosure.

As shown in FIG. 3, a control unit c includes: a second transistor T2 and a third transistor T3. A display panel further includes: a plurality of fixed potential signal lines 50 between adjacent sub-pixel units p in the second direction a2, and the plurality of fixed potential signal lines 50 extend in a first direction a1 and are arranged in the second direction a2.

The fixed potential signal line 50 may extend in the same direction as the scanning signal line 20, and one fixed potential line 50 and one scanning signal line 20 may form a group, and there is one group of signal lines arranged between two adjacent rows of sub-pixel units.

A control electrode of the second transistor T2 is connected with a control signal line 40 corresponding to the control unit c, a first electrode of the second transistor T2 is connected with a scanning signal line 20 corresponding to the control unit c, and a second electrode of the second transistor T2 is connected with control electrodes of first transistors T1 in a row of sub-pixel units corresponding to the control unit c.

A control electrode of the third transistor T3 is connected with the control signal line 40 corresponding to the control unit c, a first electrode of the third transistor T3 is connected with a fixed potential signal line 50 corresponding to the control unit c, and a second electrode of the third transistor T3 is connected with the control electrodes of the first transistors T1 in the row of the sub-pixel units corresponding to the control unit.

As shown in FIG. 3, the control electrode of the second transistor T2 and the control electrode of the third transistor T3 in the same control unit c are connected with the same control signal line 40, so the control signal line 40 simultaneously controls the second transistor T2 and the third transistor T3.

The second transistor T2 is configured to be turned on under control of the first signal transmitted by the control signal line 40, and to be turned off under control of the second signal transmitted by the control signal line 40. The third transistor T3 is configured to be turned off under control of the first signal transmitted by the control signal line 40, and to be turned on under control of the second signal transmitted by the control signal line 40.

In the embodiment of the present disclosure, the control signal line 40 may output signals in preset timing according to a set rule, and signals transmitted by the control signal line include the first signal and the second signal. The first signal is an active level signal for the second transistor T2 and an inactive level signal for the third transistor T3. The second signal is an inactive level signal for the second transistor T2 and an active level signal for the third transistor T3. In this case, when the control electrode of the second transistor T2 and the control electrode of the third transistor T3 are connected with the same control signal line 40, the second transistor T2 and the third transistor T3 are of opposite types.

With FIG. 3 as an example, one pixel island Pi includes 2 rows×2 columns of sub-pixel units p. When the control signal line 40 transmits the first signal, second transistors T2 in a control unit connected with a first row of sub-pixel units and a control unit connected with a second row of sub-pixel units are turned on, and the third transistors T3 are turned off. The second transistor T2 corresponding to the first row of sub-pixel unit may provide a signal from a first row of scanning signal line 20 to control electrodes of first transistors T1 in the first row of sub-pixel units, and a second transistor T2 corresponding to a second row of sub-pixel units may provide a signal from a second row of scanning signal line 20 to control electrodes of first transistors T1 in the second row of sub-pixel units. Since the scanning signal lines 20 sequentially output active level signals, if the first row of scanning signal line 20 transmits the active level signal, the first transistors T1 of the first row of sub-pixel units are turned on, and a data signal provided by the data signal line 30 is written to the first row of sub-pixel units. After scanning of the first row of sub-pixel units is completed, the scanning signal line 20 corresponding to the second row of sub-pixel units transmits the active level signal, and the data signal may be written to the second row of sub-pixel units according to the same rule as above. The third transistors T3 are turned off under control of the first signal, so a fixed potential transmitted by the fixed potential signal line 50 may not be transmitted to control electrodes of first transistors T1 in the row of sub-pixel units corresponding to the control unit c.

When the control signal line 40 transmits the second signal, second transistors T2 in a control unit connected with a first row of sub-pixel units and a control unit connected with a second row of sub-pixel units are turned off, and the third transistors T3 are turned on. The second transistor T2 in an off state will not transmit a scanning signal from a scanning signal line in connection with the second transistor T2 to control electrodes of first transistors T1 in a row of sub-pixel units corresponding to the scanning signal line. The third transistor T3 in an on state transmits a fixed potential signal to control electrodes of first transistors T1 in the row of sub-pixel units corresponding to the fixed potential signal line, and the first transistor T1 is in an off state under control of a fixed potential. In this case, the first transistor T1 is guaranteed to be in the off state, thus the data signal will not be written to sub-pixel units of the corresponding row.

In the case that a structure shown in FIG. 3 is used, when the display panel is refreshed based on divided areas, for an important display area or an area where human eyes focus, when a sub-pixel unit row corresponding to the important display area is scanned, corresponding control signal lines 40 may be controlled to transmit the first signal, such that a second transistor T2 corresponding to sub-pixel unit rows in the important display area is turned on, and a third transistor T3 is turned off. A scanning signal of a scanning signal line corresponding to the sub-pixel unit row is transmitted to control electrodes of first transistors T1 in sub-pixel units of the sub-pixel unit row, thus causing sub-pixel units in the important display area to refresh image data. Moreover, when an unimportant display area is scanned, corresponding control signal lines 40 may be controlled to transmit the second signal, such that a second transistor T2 corresponding to sub-pixel unit rows in the unimportant display area is turned off, and a third transistor T3 is turned on. A fixed potential signal is transmitted to control electrodes of first transistors T1 in sub-pixel units of the corresponding sub-pixel unit row, such that the first transistor T1 keeps the off state, and data signals may not be written to sub-pixel units in the unimportant area.

As a result, the image data are refreshed in the important display area but not in the unimportant display area. When the image data are refreshed in the unimportant display area, the important display area may also be controlled not to refresh the image data, such that the important display area and the unimportant display area may refresh the image data independently.

The structure shown in FIG. 3 is a planar structure of an OLED panel, and a drive circuit dr includes a storage capacitor, a drive transistor, an organic light-emitting diode, etc. A simplest pixel circuit structure of the OLED display panel is merely shown in FIG. 3. In an actual application, an OLED pixel circuit in another structure may also be used, which is not limited herein.

Figure 4:
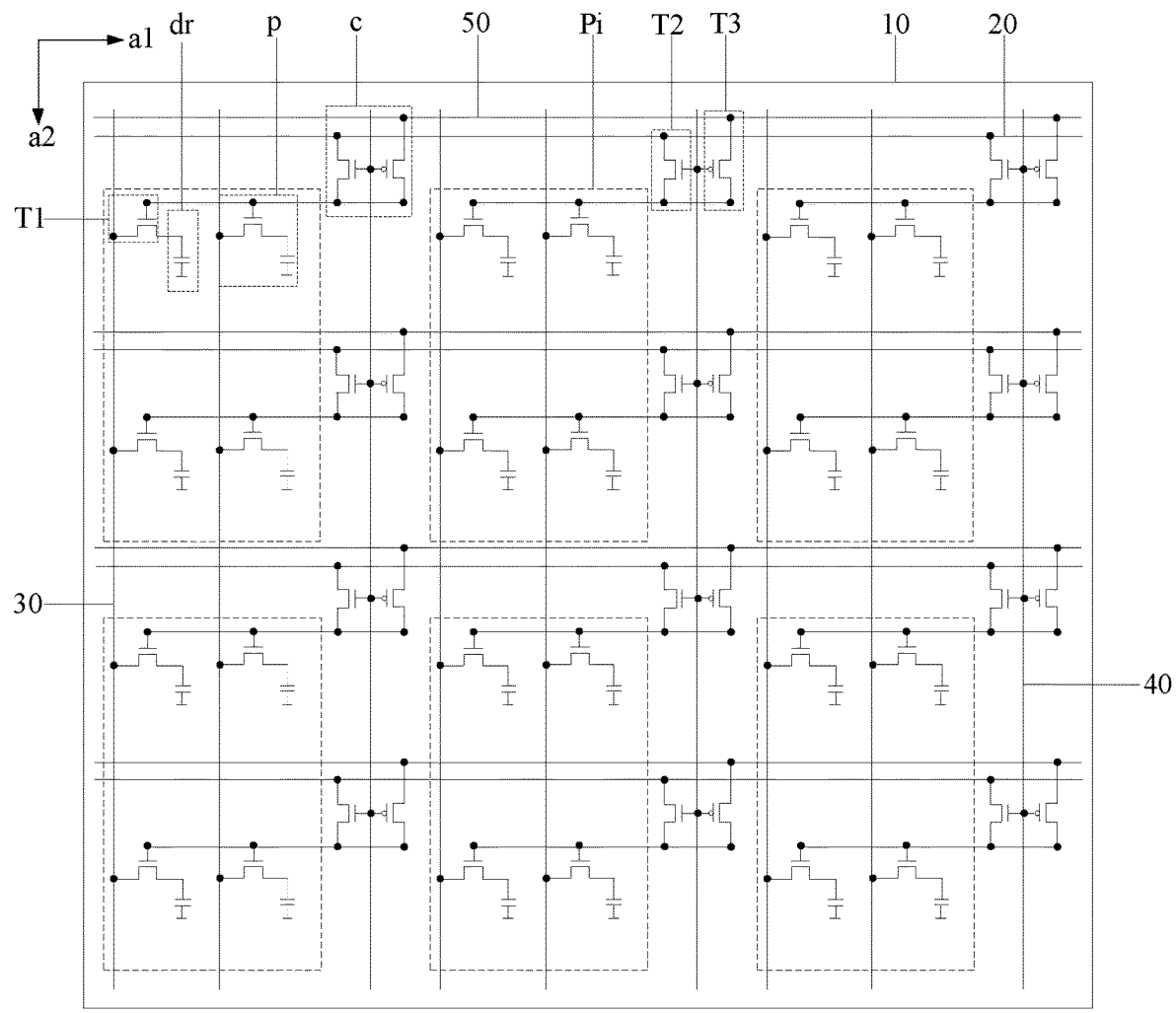
FIG. 4 is a third schematic diagram of a planar structure of a display panel according to an embodiment of the present disclosure.

Besides the OLED panel, the LCD panel may also use the control unit according to the embodiment of the present disclosure to implement gate control over the sub-pixel rows in a corresponding pixel island. FIG. 4 is a third schematic diagram of a planar structure of a display panel according to an embodiment of the present disclosure.

As shown in FIG. 4, a sub-pixel unit P includes a first transistor T1 and a drive circuit dr, and the drive circuit dr at least includes a storage capacitor. One electrode of the storage capacitor is connected with a pixel electrode of the sub-pixel unit, and the other electrode of the storage capacitor is connected with a common electrode, and a voltage between the pixel electrode and the common electrode may drive a liquid crystal to flip, such that the sub-pixel unit has different transmittance. In the LCD panel, a specific structure of a control unit c and connection relations between a first transistor T1 and a scanning signal line 20 and between the first transistor and a data signal line 30 are the same as those of the OLED panel, and reference can be made to relevant part of FIG. 3 for the specific connection relations and a drive mode, which will not be repeated herein.

In an actual application, the first transistor T1, the second transistor T2 and the third transistor T3 each may be a metal-oxide-semiconductor field-effect transistor (MOS), a complementary metal-oxide-semiconductor transistor (CMOS) or a thin film transistor (TFT). The three transistors above each may be a P-type transistor or a N-type transistor.

When the display panel is in the structure shown in FIG. 3 or 4, the second transistor T2 and the third transistor T3 are controlled by the same control signal line 40. The second transistor T2 and the third transistor T3 act in opposite ways, such that the second transistor T2 and the third transistor T3 shall be of opposite types.

For example, the second transistor T2 may be an N-type transistor, and the third transistor T3 may be a P-type transistor. For the N-type transistor, a high-level signal is an active level signal, and for a P-type transistor, a low-level signal is an active level signal, such that the first signal transmitted by the control signal line 40 is the high-level signal, and the second signal is the low-level signal.

Alternatively, the second transistor T2 may be a P-type transistor, and the third transistor T3 may be an N-type transistor. In this case, the first signal transmitted by the control signal line 40 is the low-level signal, and the second signal is the high-level signal.

In addition, the first transistor T1 may be a P-type transistor or an N-type transistor. In the case that the first transistor T1 is a P-type transistor, the first transistor T1 is turned on when a corresponding scanning signal line 20 transmits the low-level signal, and the first transistor T1 is turned off when the corresponding scanning signal line 20 transmits the high-level signal. The fixed potential signal transmitted on the fixed potential signal line 50 is used to control the first transistor T1 to be turned off, so when the first transistor T1 is a P-type transistor, the fixed potential signal transmitted on the fixed potential signal line 50 is the high-level signal.

In the case that the first transistor T1 is an N-type transistor, the first transistor T1 is turned on when a corresponding scanning signal line 20 transmits the high-level signal, and the first transistor T1 is turned off when the corresponding scanning signal line 20 transmits the low-level signal. The fixed potential signal transmitted on the fixed potential signal line 50 is used to control the first transistor T1 to be turned off, so when the first transistor T1 is an N-type transistor, the fixed potential signal transmitted on the fixed potential signal line 50 is the low-level signal.

Figure 5:
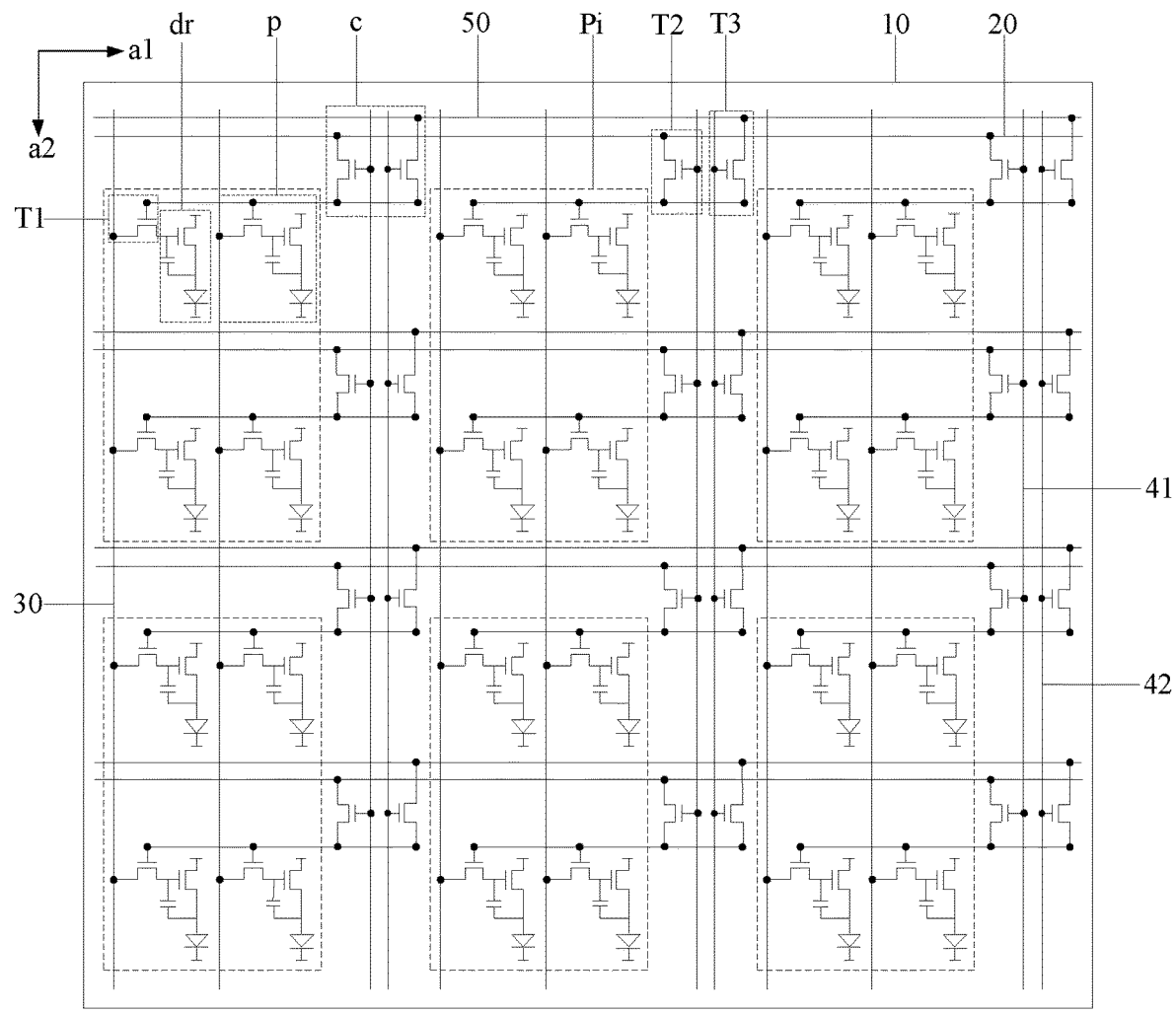
FIG. 5 is a fourth schematic diagram of a planar structure of a display panel according to an embodiment of the present disclosure.

FIG. 5 is a fourth schematic diagram of a planar structure of a display panel according to an embodiment of the present disclosure. Alternatively, the control unit c may also be in a structure shown in FIG. 5.

As shown in FIG. 5, the control unit c includes a second transistor T2 and a third transistor T3. Control signal lines include a first control signal line 41 and a second control signal line 42.

A plurality of first control signal lines 41 are located between adjacent pixel islands Pi in a first direction a1, and the first control signal lines 41 extend in the second direction a2 and are arranged in the first direction a1.

A plurality of second control signal lines 42 are located between the adjacent pixel islands in the first direction a1, and the plurality of second control signal lines 42 extend in the second direction a2 and are arranged in the first direction a1.

The first control signal line 41 and the second control signal line 42 extend in the same direction as the data signal line 30. One first control signal line 41 and one second control signal line 42 form a group, and a group of control signal lines are arranged between two adjacent columns of pixel islands.

The display panel further includes: a plurality of fixed potential signal lines 50 located between adjacent sub-pixel units p in the second direction a2, and the plurality of fixed potential signal lines extend in the first direction a1 and are arranged in the second direction a2.

The fixed potential signal line 50 may extend in the same direction as the scanning signal lines 20, and one fixed potential line 50 and one scanning signal line 20 may form a group, and a group of signal lines are arranged between two adjacent sub-pixel unit rows.

A control electrode of the second transistor T2 is connected with a first control signal line 41 corresponding to the control unit c, a first electrode of the second transistor T2 is connected with a scanning signal line 20 corresponding to the control unit c, and a second electrode of the second transistor T2 is connected with control electrodes of first transistors T1 in sub-pixel unit row corresponding to the control unit c.

A control electrode of the third transistor T3 is connected with a second control signal line 42 corresponding to the control unit c, a first electrode of the third transistor T3 is connected with a fixed potential signal line 50 corresponding to the control unit c, and a second electrode of the third transistor T3 is connected with the control electrodes of the first transistors T1 in the sub-pixel unit row corresponding to the control unit c.

As shown in FIG. 5, in the same control unit c, the control electrode of the second transistor T2 is connected with the first control signal line 41, and the control electrode of the third transistor T3 is connected with the second control signal line 42. In this case, two control signal lines are used to control the second transistor T2 and the third transistor T3 respectively.

The second transistor T2 is configured to be turned on under control of a first signal transmitted by the first control signal line 41, and to be turned off under control of a second signal transmitted by the first control signal line 41. The third transistor T3 is configured to be turned on under control of a third signal transmitted by the second control signal line 42, and to be turned off under control of a fourth signal transmitted by the second control signal line 42.

In the embodiment of the present disclosure, the first control signal line 41 and the second control signal line 42 may output signals in a preset timing according to a set rule, and the second electrodes of the second transistor T2 and the third transistor T3 are connected with the control electrodes of the first transistor T1 in the sub-pixel unit row corresponding to the control unit. In this case, when the second transistor T2 is turned on, the third transistor T3 is turned off, and when the third transistor T3 is turned on, the second transistor T2 is turned off.

With FIG. 5 as an example, one pixel island Pi includes 2 rows×2 columns of sub-pixel units p. When the first control signal line 41 transmits the first signal, the second control signal line 42 transmits the fourth signal. Second transistors T2 in a control unit connected with a first row of sub-pixel units and a control unit connected with a second row of sub-pixel units are turned on, and the third transistors T3 are turned off. The second transistor T2 corresponding to the first row of sub-pixel unit may provide a signal from a first row of scanning signal line 20 to control electrodes of first transistors T1 in the first row of sub-pixel units, and a second transistor T2 corresponding to a second row of sub-pixel units may provide a signal from a second row of scanning signal line 20 to control electrodes of first transistors T1 in the second row of sub-pixel units. Since the scanning signal lines 20 sequentially output active level signals, if the first row of scanning signal line 20 transmits the active level signal, the first transistors T1 of the first row of sub-pixel units are turned on, and data signals provided by the data signal lines 30 are written to the first row of sub-pixel units. After scanning of the first row of sub-pixel units is completed, the scanning signal line 20 corresponding to the second row of sub-pixel units transmits the active level signal, and data signals may be written to the second row of sub-pixel units according to the same rule as above. The third transistors T3 are turned off under control of the fourth signal, so a fixed potential transmitted by the fixed potential signal line 50 will not be transmitted to the control electrodes of the first transistors T1 in the sub-pixel unit row corresponding to the control unit.

When the first control signal line 41 transmits the second signal, the second control signal line 42 transmits the third signal. Second transistors T2 in a control unit connected with a first row of sub-pixel units and a control unit connected with a second row of sub-pixel units are turned off, and the third transistors T3 are turned on. The second transistor T2 in a closed state will not transmit a scanning signal from a scanning signal line of a corresponding row to control electrodes of first transistors T1 in sub-pixel unit row corresponding to the control unit. The third transistor T3 in an on state transmits a fixed potential signal to control electrodes of first transistors T1 in sub-pixel unit row corresponding to the control unit. The first transistor T1 is in an off state under control of a fixed potential, such that the first transistor T1 is guaranteed to be in the off state. In this case, data signals may not be written to sub-pixel units of a corresponding row.

In the case that a structure shown in FIG. 5 is used, when the display panel is refreshed based on divided areas, for an important display area or an area where human eyes focus, when a sub-pixel unit row in the important display area is scanned, corresponding first control signal lines 41 may be controlled to transmit the first signals, corresponding second control signal lines 42 may be controlled to transmit the fourth signal, such that a second transistor T2 corresponding to the sub-pixel unit row in the important display area is turned on, and a third transistor T3 is turned off. A scanning signal from a scanning signal line corresponding to the sub-pixel unit row is transmitted to control electrodes of first transistors T1 in sub-pixel units of the sub-pixel unit row, thus causing sub-pixel units in the important display area to refresh image data. Moreover, when an unimportant display area is scanned, corresponding first control signal lines 41 may be controlled to transmit the second signal, and corresponding second control signal lines 42 may be controlled to transmit the third signal, such that a second transistor T2 corresponding to sub-pixel unit row in the unimportant display area is turned off, and a third transistor T3 is turned on. A fixed potential signal is transmitted to control electrodes of first transistors T1 in sub-pixel units the sub-pixel unit row, such that the first transistor T1 keeps the off state, and data signals will not be written to sub-pixel units in the unimportant area.

As such, the image data are refreshed in the important display area but not in the unimportant display area. When the image data are refreshed in the unimportant display area, the important display area may also be controlled not to refresh the image data, such that the important display area and the unimportant display area may refresh the image data independently.

The solution of using two control signal lines may avoid occurrence of abnormal data writing caused by abnormal timing of the control signal lines.

The structure shown in FIG. 5 is a planar structure of an OLED panel, and a drive circuit dr includes a storage capacitor, a drive transistor, an organic light-emitting diode, etc. A simplest pixel circuit structure of the OLED display panel is merely shown in FIG. 5. In an actual application, an OLED pixel circuit in another structure may also be used, which is not limited herein.

Figure 6:
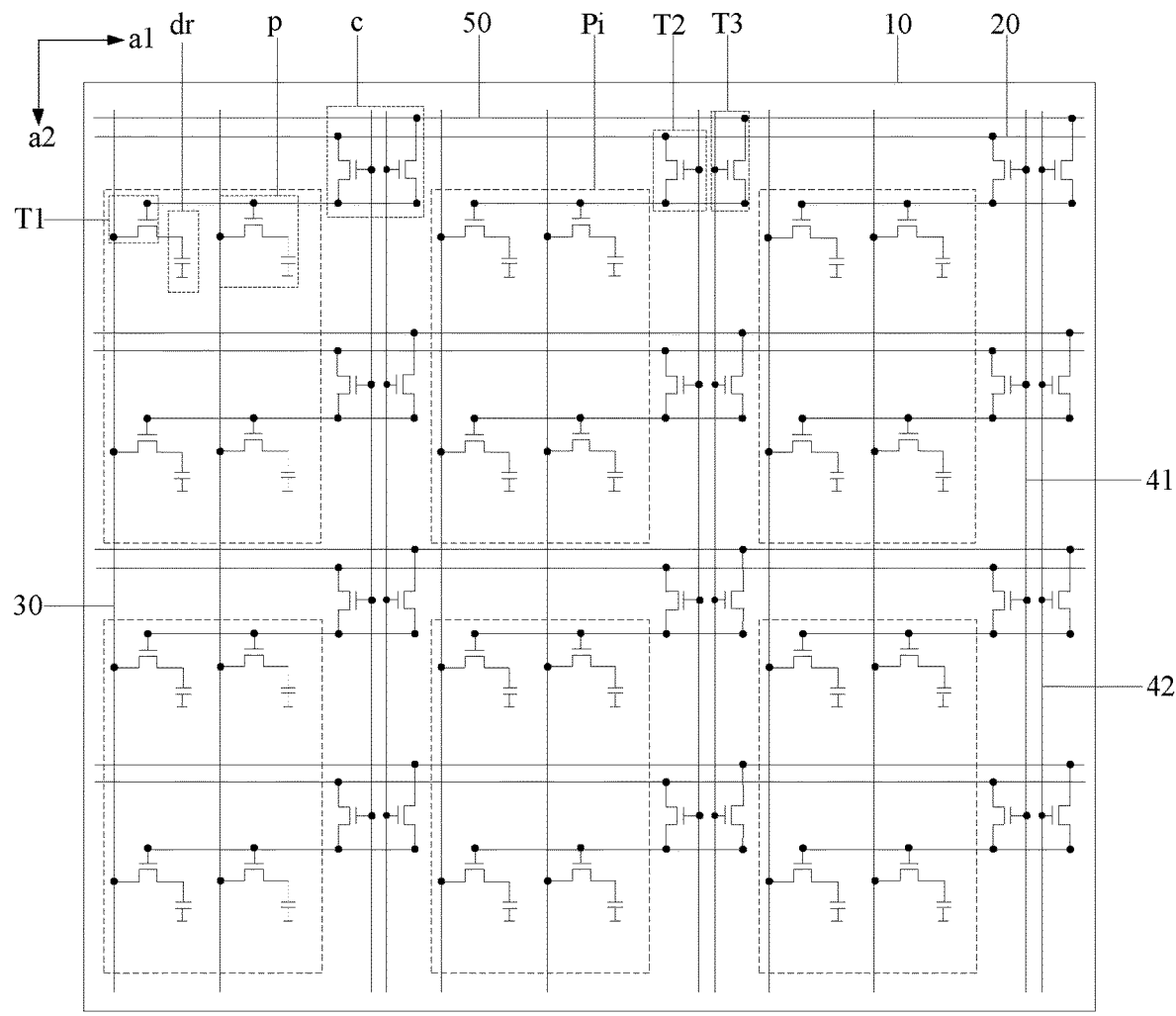
FIG. 6 is a fifth schematic diagram of a planar structure of a display panel according to an embodiment of the present disclosure.

Besides the OLED panel, the LCD panel may also use the control unit according to the embodiment of the present disclosure to implement gate control over the sub-pixel rows in a corresponding pixel island. FIG. 6 is a fifth schematic diagram of a planar structure of a display panel according to an embodiment of the present disclosure.

As shown in FIG. 6, a sub-pixel unit P includes a first transistor T1 and a drive circuit dr, and the drive circuit dr at least includes a storage capacitor. A structure shown in FIG. 6 is different from the structure shown in FIG. 4 in that a first control signal line 41 and a second control signal line 42 are used to control the second transistor T2 and the third transistor T3 respectively, and the remaining of the structure is the same to that of FIG. 4, and reference can be made to relevant contents of FIG. 4 for specific relevant contents of FIG. 4, which will not be repeated herein.

In an actual application, the first transistor T1, the second transistor T2 and the third transistor T3 each may be a MOS, CMOS or TFT. The three transistors each may be a P-type transistor or N-type transistor.

When the display panel uses the circuit structure as shown in FIG. 5 or FIG. 6, the second transistor T2 and the third transistor T3 are independently controlled by different control signal lines, and it is merely necessary to keep the second transistor T2 and the third transistor T3 work in opposite ways at the same time.

The second transistor T2 and the third transistor T3 may be the same type of transistors or not. For example, the second transistor T2 may be an N-type transistor, and the third transistor T3 may also be an N-type transistor. Alternatively, the second transistor T2 may be a P-type transistor, and the third transistor T3 may also be a P-type transistor. Alternatively, the second transistor T2 may be an N-type transistor, and the third transistor T3 may be a P-type transistor. Alternatively, the second transistor T2 may be a P-type transistor, and the third transistor T3 may be an N-type transistor. During specific implementation, selection can be made according to actual needs, and is not limited herein.

For the N-type transistor, a high-level signal is an active level signal, and for a P-type transistor, a low-level signal is an active level signal.

When the second transistor T2 is an N-type transistor, a first signal transmitted by the first control signal line 41 is a high-level signal, and a second signal is a low-level signal. When the second transistor T2 is a P-type transistor, a first signal transmitted by the first control signal line 41 is a low-level signal, and the second signal is a high-level signal.

When the third transistor T3 is an N-type transistor, a third signal transmitted by the second control signal line 42 is a high-level signal, and the fourth signal is a low-level signal. When the third transistor T3 is a P-type transistor, a third signal transmitted by the second control signal line 42 is a low-level signal, and the fourth signal is a high-level signal.

In addition, the first transistor T1 may be a P-type transistor or an N-type transistor. In the case that the first transistor T1 is a P-type transistor, the first transistor T1 is turned on when a scanning signal line 20 of a corresponding row transmits the low-level signal, and the first transistor T1 is turned off when the scanning signal line 20 of the corresponding row transmits the high-level signal. The fixed potential signal transmitted on the fixed potential signal line 50 is used to control the first transistor T1 to be turned off, so when the first transistor T1 is a P-type transistor, the fixed potential signal transmitted on the fixed potential signal line 50 is the high-level signal.

In the case that the first transistor T1 is an N-type transistor, the first transistor T1 is turned on when a scanning signal line 20 of a corresponding row transmits the high-level signal, and the first transistor T1 is turned off when the scanning signal line 20 of the corresponding row transmits the low-level signal. The fixed potential signal transmitted on the fixed potential signal line 50 is used to control the first transistor T1 to be turned off, so when the first transistor T1 is an N-type transistor, the fixed potential signal transmitted on the fixed potential signal line 50 is the low-level signal.

Figure 7:
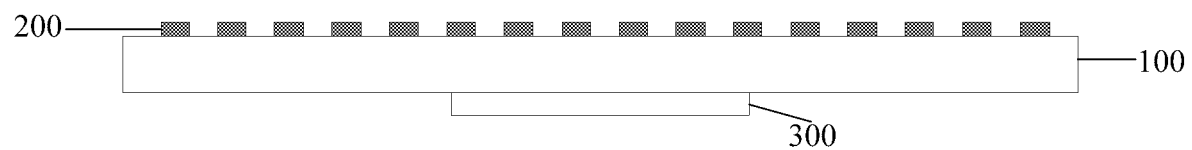
FIG. 7 is a schematic sectional view of a display device according to an embodiment of the present disclosure.

Based on the same inventive concept, the embodiment of the present disclosure further provides a display device. FIG. 7 is a schematic structural diagram of a section of a display device according to an embodiment of the present disclosure.

As shown in FIG. 7, the display device includes any display panel 100 above, a microlens layer 200 and a controller 300.

The microlens layer 200 is disposed on a light emitting side of the display panel 100. The microlens layer 200 includes a plurality of microlenses corresponding to pixel islands of the display panel, and the microlens is configured to modulate light from the pixel island in the display panel, to cause the pixel island to be mapped into a pixel array and realize image display.

The controller 300 is connected with the display panel 100 and configured to provide a drive signal for the display panel.

A specific structure of the pixel island in the display panel 100 may be a structure shown in FIG. 1. The microlens layer 200 is composed of a microlens array, and the microlens layer 200 modulates light from the pixel island, so as to map the pixel island into a pixel array for image display. By using a structure combining the pixel island and the microlens layer 200, even when the physical arrangement of the sub-pixel units reaches its limit, the display resolution can be improved. The display panel 100 is further provided with a drive chip in a non-display area at a side of a sub-pixel unit column, and a cascade gate drive unit is arranged at one side or two sides of a sub-pixel unit row. A data signal line may be connected with the drive chip by being connected with various multiplexers, and gates are connected with corresponding gate drive units respectively. The gate drive unit is finally connected with the drive chip, and the controller 300 is connected with the drive chip in the display panel 100. The controller 300 may be a graphics processing unit (GPU) arranged in the display device, or a processing device arranged outside the display device, which is not limited herein.

The controller 300 is configured to provide a drive signal for the drive chip of the display panel. If a display area of the display device is divided into an important display area displaying important image details and other display areas, the controller 300 compresses image data of the unimportant display area, and then transmits image data of the important display area and image of the unimportant display area to the drive chip, and the drive chip controls the important display area and the unimportant display area to refresh the image data separately. While the important display area is driven at high resolution, a high refresh rate and a high response speed, for other unimportant display areas, transmission data can be compressed, and display resolution and a refresh rate can be reduced, such that limited resources can be preferentially allocated to the important display area, and the limitation problems such as a high data transmission bandwidth, high equipment power consumption and insufficient pixel charging are solved.

The display device according to the embodiment of the present disclosure may further include a camera not shown in the figures, the camera is arranged at a bezel area of the display device, where the camera is configured to photograph eyes of an user, cause the controller 300 to determine a focus area of the user on the display device according to a shot image, and drive the focus area and a non-focus area in the display panel 100 to implement image display at different refresh rates.

Figure 8:
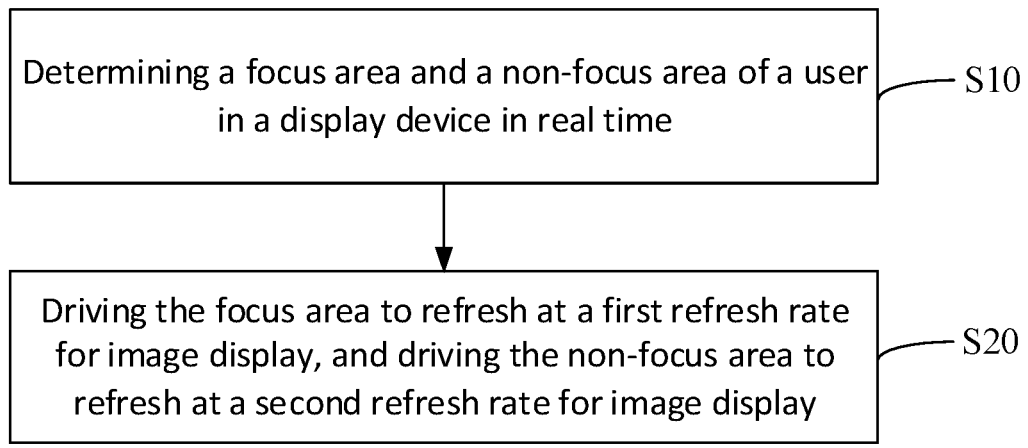
FIG. 8 is a flowchart of a driving method for a display device according to an embodiment of the present disclosure.

Based on a structure of the display device, the embodiment of the present disclosure also provides a drive method based on a display device, and FIG. 8 is a flowchart of a drive method based on a display device according to an embodiment of the present disclosure.

As shown in FIG. 8, the drive method based on a display device includes the following steps.

S10, determining a focus area and a non-focus area of a user in a display device in real time.

S20, driving the focus area to refresh at a first refresh rate for image display, and driving the non-focus area to refresh at a second refresh rate for image display.

The first refresh rate is higher than the second refresh rate.

According to the embodiment of the present disclosure, the focus area and the non-focus area for displayed image of the display device are determined, the focus area is driven for image display at a high refresh rate, and the non-focus area is driven for image display at a low refresh rate, such that image display quality of the focused focus area is guaranteed, while the focus area is driven at high resolution, a high refresh rate and a high response speed, for the non-focus area, transmission data can be compressed, and display resolution and a refresh rate can be reduced, such that limited resources can be preferentially allocated to the focus area, and the limitation problems such as a high data transmission bandwidth, high equipment power consumption and insufficient pixel charging are solved.

The focus area may be a fixed area set by a system, for example, a central area of a displayed picture may be set as the focus area, and an edge area may be set as the non-focus area. Different image rendering is performed on the focus area and the non-focus area, and on the basis of guaranteeing that the non-focus area may fully display pictures, the image data of the non-focus area are compressed appropriately, so as to reduce display resolution of the non-focus area and make the focus area have a better display effect. In this way, overall power consumption of the display device is reduced and waste of resources is avoided.

In addition, a camera may be arranged on the display device, such that the focus area of a user on the display device may be determined through the camera.

Specifically, the camera is controlled to photograph eyes of the user in real time.

The focus area of the user on the display device is determined according to an image shot by the camera.

The remaining area on the display device except the focus area is determined as the non-focus area.

During specific implementation, an image displayed on the display device is usually large, and human eyes merely gaze at a local area of the image. Therefore, according to the embodiment of the present disclosure, the focus area of human eyes on the display device is tracked in real time by arranging the camera on the display device or externally connected with the camera, the focus area is driven for image display at a high refresh rate in real time, and an image refresh rate of the non-focus area is reduced, such that the limitation problems such as a high data transmission bandwidth, high equipment power consumption and insufficient pixel charging are solved.

In order to make the image refresh rate of the focus area greater than the image refresh rate of the non-focus area, the embodiment of the present disclosure may refresh a display picture in the following two modes.

In an implementable mode, sub-pixel units in the focus area and sub-pixel units in the non-focus area may be driven to refresh a times and b times respectively, where a and b are positive integers, and a is greater than b.

In this case, the focus area and the non-focus area are independently refreshed, and when the focus area is refreshed, the non-focus area is not refreshed. When the non-focus area is refreshed, the focus area is refreshed. In this way, as long as the image refresh times in the focus area per unit time are greater the image refresh times in the non-image area per unit time, an image refresh rate for the focus area is greater than an image refresh rate for the non-focus area, thereby making the displayed image in the focus area more delicate and coherent.

In another implementable mode, sub-pixel units in the focus area may be driven to refresh c times first, and then sub-pixel units in the focus area and the non-focus area may be driven to refresh d times, where c and d are positive integers.

In this case, when the displayed picture is refreshed, image refresh in the focus area may be performed several times first, and then the entire displayed picture may be refreshed after the above refresh operation is completed, such that the refresh times of the focus area can be guaranteed to be greater than the refresh times of the non-focus area, and the image refresh rate of the focus area is greater than the image refresh rate of the non-focus area. In this mode, the image refresh in the focus area can be performed many times within unit time, which is conducive to optimization of a display effect of the focus area.

No matter which image refresh mode is used, independent drive control over the focus area is required, and the embodiment of the present disclosure may achieve independent refresh control over the focus area and the non-focus area by using any display panel structure above.

Figure 9:
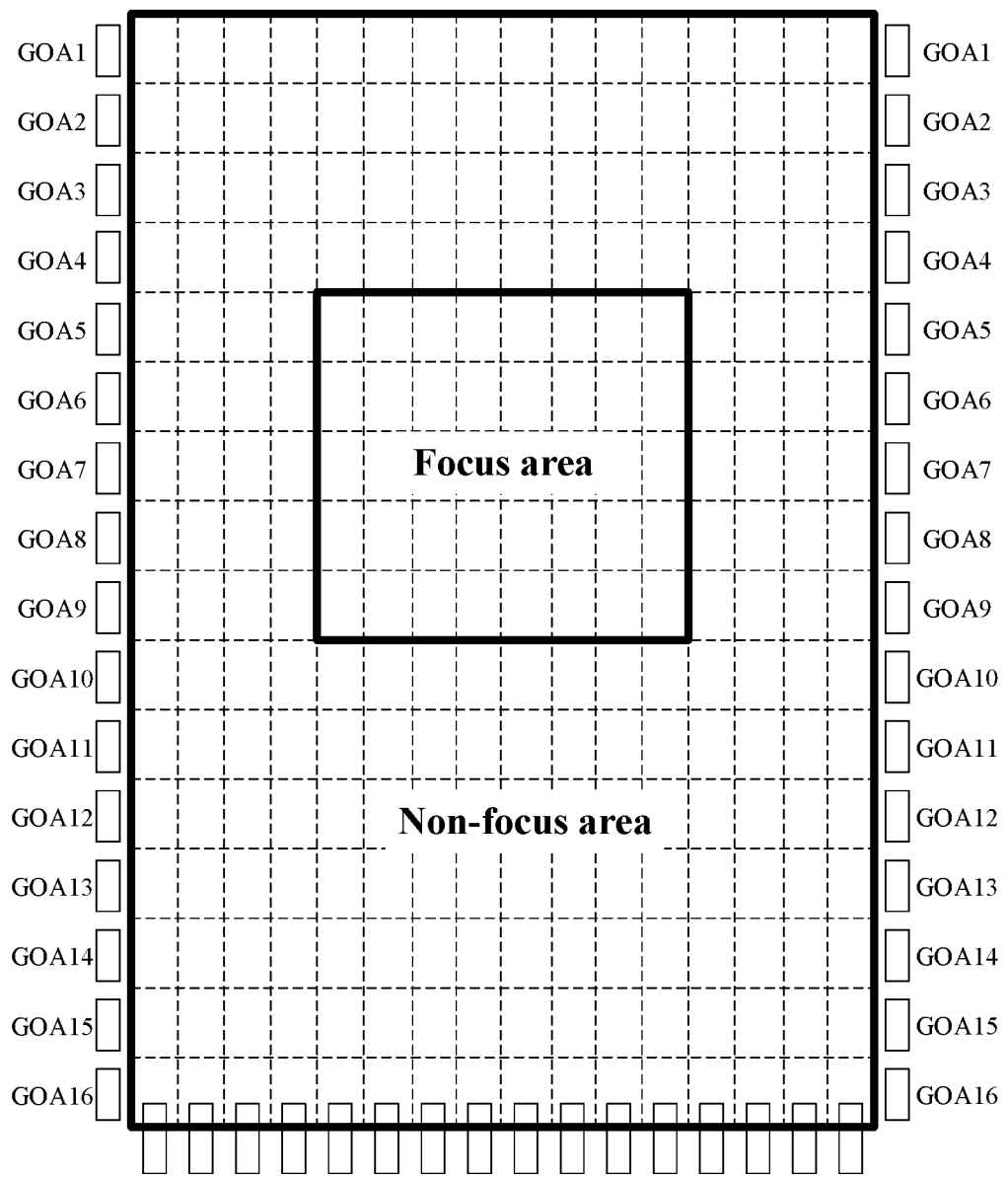
FIG. 9 is a schematic diagram of a planar structure of a display device according to an embodiment of the present disclosure.

FIG. 9 is a schematic diagram of a planar structure of a display device according to an embodiment of the present disclosure.

As shown in FIG. 9, a display area may be divided into a plurality of areas in an extension direction of a gate drive circuit. In a structure shown in FIG. 9, the embodiment of the present disclosure may divide the display area into 16 sub-areas, and each of the 16 sub-areas is independently driven by 16 gate drive units (GOA1-GOA16). Assuming that a focus area of a user on the display device determined by a camera and other devices is an area corresponding to a box in black line in FIG. 9, the focus area is driven by the gate drive units GOA5-GOA9.

When the image refresh is merely performed in the focus area, with a display panel structure shown in FIG. 3 or FIG. 4 as an example, the gate drive units GOA5-GOA9 are controlled to sequentially transmit active level signals, control signal lines 40 corresponding to the focus area are controlled to transmit a first signal, and fixed potential signal lines 50 corresponding to the focus area are controlled to transmit a fixed potential signal. Second transistors T2 corresponding to pixel islands in the focus area are turned on, and third transistors T3 are turned off. A scanning signal transmitted by a scanning signal line 20 is transmitted to control electrodes of first transistors T1 of rows of sub-pixel units through the second transistors T2, and the first transistor T1 is turned on under control of the active level signal of the scanning signal line 20, such that data signals provided by the data signal line 30 corresponding to sub-pixel units in the focus area are written to the sub-pixel units. In addition, control signal lines 40 corresponding to the non-focus area in sub-pixel unit rows corresponding to the gate drive units GOA5-GOA9 are controlled to transmit a second signal, and fixed potential signal lines 50 corresponding to the non-focus area are controlled to transmit a fixed potential signal. Second transistors T2 corresponding to pixel islands in the non-focus area are turned off, and third transistors T3 are turned on. The fixed potential signal transmitted by the fixed potential signal line 50 is transmitted to control electrodes of first transistors T1 of rows of sub-pixel units through the third transistor T3, and the first transistor T1 is kept off under control of the fixed potential signal, such that image data in the non-focus area may not be written to sub-pixel units. In this way, the image data of the focus area are independently refreshed.

With a display panel structure shown in FIG. 5 or FIG. 6 as an example, the gate drive units GOA5-GOA9 are controlled to sequentially transmit active level signals, first control signal lines 41 corresponding to the focus area are controlled to transmit a first signal, second control signal lines 42 corresponding to the focus area are controlled to transmit a fourth signal, and fixed potential signal lines 50 corresponding to the focus area are controlled to transmit a fixed potential signal. Second transistors T2 corresponding to pixel islands in the focus area are turned on, and third transistors T3 are turned off. A scanning signal transmitted by a scanning signal line 20 is transmitted to control electrodes of first transistors T1 of rows of sub-pixel units through the second transistors T2, and the first transistor T1 is turned on under control of the active level signal of the scanning signal line 20, such that data signals provided by the data signal line 30 corresponding to sub-pixel units in the focus area are written to the sub-pixel units. In addition, first control signal lines 41 corresponding to the non-focus area in sub-pixel unit rows corresponding to the gate drive units GOA5-GOA9 are controlled to transmit a second signal, second control signal lines 42 corresponding to the non-focus area are controlled to transmit a third signal, and fixed potential signal lines 50 corresponding to the non-focus area are controlled to transmit a fixed potential signal. Second transistors T2 corresponding to pixel islands in the non-focus area are turned off, and third transistors T3 are turned on. The fixed potential signal transmitted by the fixed potential signal line 50 is transmitted to control electrodes of first transistors T1 of rows of sub-pixel units through the third transistor T3, and the first transistor T1 is kept off under control of the fixed potential signal, such that image data in the non-focus area may not be written to sub-pixel units. In this way, the image data of the focus area are independently refreshed.

When the image refresh is merely performed in the non-focus area, with a display panel structure shown in FIG. 3 or 4 as an example, the gate drive units GOA1-GOA16 are controlled to sequentially transmit active level signals, and when sub-pixel unit rows corresponding to the gate drive units GOA1-GOA4 are scanned, all control signal lines 40 are controlled to transmit a first signal, and all fixed potential signal lines are controlled to transmit a fixed potential signal, such that image data may be written to the rows of sub-pixel units corresponding to the gate drive units GOA1-GOA4. When sub-pixel unit rows corresponding to the gate drive units GOA5-GOA9 are scanned, control signal lines 40 corresponding to the non-focus area are controlled to transmit a first signal, and control signal lines 40 corresponding to the focus area are controlled to transmit a second signal, such that image data are written to non-focus areas corresponding to the gate drive units GOA5-GOA9, but not written to focus areas corresponding to the gate drive units GOA5-GOA9. When sub-pixel unit rows corresponding to the gate drive units GOA10-GOA16 are scanned, all control signal lines 40 are controlled to transmit a first signal, and all fixed potential signal lines are controlled to transmit a fixed potential signal, such that image data may be written to rows of sub-pixel units corresponding to the gate drive units GOA10-GOA16. In this way, the image data of the non-focus area are independently refreshed.

With a display panel structure shown in FIG. 5 or 6 as an example, the gate drive units GOA1-GOA16 are controlled to sequentially transmit active level signals, and when sub-pixel unit rows corresponding to the gate drive units GOA1-GOA4 are scanned, all first control signal lines 41 are controlled to transmit a first signal, all second control signal lines 42 are controlled to transmit a fourth signal, and all fixed potential signal lines are controlled to transmit a fixed potential signal, such that image data may be written to the rows of sub-pixel units corresponding to the gate drive units GOA1-GOA4. When sub-pixel unit rows corresponding to the gate drive units GOA5-GOA9 are scanned, first control signal lines 41 corresponding to the non-focus area are controlled to transmit a first signal, second control signal lines 42 corresponding to the non-focus area are controlled to transmit a fourth signal, first control signal lines 41 corresponding to the focus area are controlled to transmit a second signal, and second control signal lines 42 corresponding to the focus area are controlled to transmit a third signal, such that image data are written to non-focus areas corresponding to the gate drive units GOA5-GOA9, but not written to focus areas corresponding to the gate drive units GOA5-GOA9. When sub-pixel unit rows corresponding to the gate drive units GOA10-GOA16 are scanned, all first control signal lines 41 are controlled to transmit a first signal, all second control signal lines 42 are controlled to transmit a fourth signal, and all fixed potential signal lines are controlled to transmit a fixed potential signal, such that image data may be written to the rows of sub-pixel units corresponding to the gate drive units GOA10-GOA4. In this way, the image data of the non-focus area are independently refreshed.

When image refresh is performed in the entire display area, all the control signal lines may be controlled to transmit the first signal, and all the fixed potential signal lines may be controlled to transmit the fixed potential signal, such that all the sub-pixel units may be scanned and image data are written in conventional modes, and refresh of the entire displayed picture is completed.

During specific implementation, a system terminal (that is, a controller 300 terminal) preferentially implement image refresh in the focus area, and image refresh in the focus area is implemented without compression and at high resolution, and then image refresh is implemented in the non-focus area with high-multiple compression and at low resolution.

The controller 300 transmits the image data of the focus area and the non-focus area to a drive chip of the display panel 100, and the drive chip first receives the image data and drives sub-pixel units of the focus area to refresh. After the focus area is refreshed, the drive chip decompresses the image data of the non-focus area and drives sub-pixel units of the non-focus area to refresh.

In addition, the drive chip may further drive the sub-pixel unit of the focus area to refresh first, and then drive all the sub-pixel units of the focus area and the non-focus area to refresh, which is not limited herein.

According to the display panel, the display device and the drive method according to the embodiments of the present disclosure, by arranging the control signal line and the control unit in the display panel, and combining control over timing of the pixel island, the sub-pixel unit rows in one pixel island can be controlled independently relative to sub-pixel unit rows in another pixel island. Based on this, the display panel may be divided into areas based on images, and image refresh may be performed separately in the important display area, or the focus area where human eyes focus and other display areas. The important display area or the focus area may have a refresh rate that is N times as high as refresh rates of other display areas. While the important display area is driven at the high resolution, the high refresh rate and the high response speed, for other display areas, transmission data can be compressed, and display resolution and a refresh rate can be reduced, such that limited resources can be preferentially allocated to the important display area, and the limitation problems such as a high data transmission bandwidth, high equipment power consumption and insufficient pixel charging are solved.

Although preferred embodiments of the present disclosure have been described, a person of ordinary skill in the art can make additional changes and modifications to these embodiments once they learn the basic inventive concept. Therefore, the appended claims are intended to be construed as including the preferred embodiments and all changes and modifications falling within the scope of the present disclosure.

Apparently, a person of ordinary skill in the art can make various modifications and variations to the embodiments of the present disclosure without departing from the spirit and scope of the embodiments of the present disclosure. In this way, if these modifications and variations of the embodiments of the present disclosure fall within the scope of the claims of the present disclosure and their equivalents, the present disclosure intends to include these modifications and variations.

What is claimed is:

1. A display panel, comprising:
    a substrate;
    a plurality of scanning signal lines on the substrate, wherein the plurality of scanning signal lines extend in a first direction and are arranged in a second direction, and the first direction and the second direction intersect;
    a plurality of data signal lines on the substrate, wherein the plurality of data signal lines extend in the second direction and are arranged in the first direction;
    a plurality of sub-pixel units located in areas formed by the plurality of scanning signal lines and the plurality of data signal lines respectively, wherein at least two adjacent sub-pixel units in the first direction and the second direction constitute a pixel island;
    a plurality of control units located between adjacent pixel islands in the first direction, wherein one pixel island is correspondingly connected with n control units, n represents a quantity of sub-pixel unit rows comprised in the pixel island in the second direction, and one control unit corresponds to one sub-pixel unit row in the pixel island in the first direction; and
    a plurality of control signal lines located between the adjacent pixel islands in the first direction respectively, wherein the plurality of control signal lines extend in the second direction and are arranged in the first direction;
    wherein:
    the sub-pixel unit comprises a first transistor and a drive circuit, a first electrode of the first transistor is connected with a data signal line corresponding to a sub-pixel unit column comprising the sub-pixel unit, a second electrode of the first transistor is connected with the drive circuit in the sub-pixel unit, and a control electrode of the first transistor is connected with control electrodes of first transistors of sub-pixel units located in a same row in the first direction in the pixel island;
    the control unit comprises a control terminal, an input terminal and an output terminal, the control terminal of the control unit is connected with a control signal line corresponding to the control unit, the input terminal of the control unit is connected with a scanning signal line corresponding to the control unit, and the output terminal of the control unit is connected with control electrodes of first transistors in a sub-pixel unit row corresponding to the control unit; and
    the control unit is configured to transmit a signal from the input terminal to the output terminal under control of a first signal transmitted by the control signal line, and stop transmitting the signal from the input terminal to the output terminal under control of a second signal transmitted by the control signal line.

2. The display panel according to claim 1, wherein the control unit comprises: a second transistor and a third transistor, and the display panel further comprises:
    a plurality of fixed potential signal lines located between adjacent sub-pixel units in the second direction respectively, and the plurality of fixed potential signal lines extend in the first direction and are arranged in the second direction;

a control electrode of the second transistor is connected with the control signal line corresponding to the control unit, a first electrode of the second transistor is connected with the scanning signal line corresponding to the control unit, and a second electrode of the second transistor is connected with control electrodes of first transistors in the sub-pixel unit row corresponding to the control unit;

a control electrode of the third transistor is connected with the control signal line corresponding to the control unit, a first electrode of the third transistor is connected with a fixed potential signal line corresponding to the control unit, and a second electrode of the third transistor is connected with the control electrodes of the first transistors in the sub-pixel unit row corresponding to the control unit;

the second transistor is configured to be turned on under control of the first signal transmitted by the control signal line, and to be turned off under control of the second signal transmitted by the control signal line; and the third transistor is configured to be turned off under control of the first signal transmitted by the control signal line, and to be turned on under control of the second signal transmitted by the control signal line.

3. The display panel according to claim 2, wherein the second transistor is an N-type transistor, the third transistor is a P-type transistor, the first signal is a high-level signal, and the second signal is a low-level signal;

or the second transistor is a P-type transistor, the third transistor is an N-type transistor, the first signal is a low-level signal, and the second signal is a high-level signal.

4. The display panel according to claim 1, wherein the control unit comprises: a second transistor and a third transistor, the control signal line is a first control signal line, and the display panel further comprises:

a plurality of second control signal lines located between the adjacent pixel islands in the first direction respectively, and the plurality of second control signal lines extend in the second direction and are arranged in the first direction; and a plurality of fixed potential signal lines located between adjacent sub-pixel units in the second direction respectively, and the plurality of fixed potential signal lines extend in the first direction and are arranged in the second direction; wherein a control electrode of the second transistor is connected with the first control signal line corresponding to the control unit, a first electrode of the second transistor is connected with the scanning signal line corresponding to the control unit, and a second electrode of the second transistor is connected with control electrodes of first transistors in the sub-pixel unit row corresponding to the control unit;

a control electrode of the third transistor is connected with a second control signal line corresponding to the control unit, a first electrode of the third transistor is connected with a fixed potential signal line corresponding to the control unit, and a second electrode of the third transistor is connected with the control electrodes of the first transistors in the sub-pixel unit row corresponding to the control unit;

the second transistor is configured to be turned on under control of the first signal transmitted by the first control signal line, and to be turned off under control of the second signal transmitted by the first control signal line; and the third transistor is configured to be turned on under control of a third signal transmitted by the second control signal line, and to be turned off under control of a fourth signal transmitted by the second control signal line.

5. The display panel according to claim 4, wherein the second transistor is an N-type transistor, the first signal is a high-level signal, and the second signal is a low-level signal; or, the second transistor is a P-type transistor, the first signal is a low-level signal, and the second signal is a high-level signal; and the third transistor is an N-type transistor, the third signal is a high-level signal, and the fourth signal is a low-level signal; or, the third transistor is a P-type transistor, the third signal is a low-level signal, and the fourth signal is a high-level signal.

6. The display panel according to claim 2, wherein the first transistor is an N-type transistor, and the fixed potential signal line is configured to transmit the low-level signal;

or the first transistor is the P-type transistor, and the fixed potential signal line is configured to transmit the high-level signal.

7. The display panel according to claim 1, wherein the display panel is a liquid crystal display panel or an organic light-emitting diode display panel.

8. The display panel according to claim 1, wherein display colors of sub-pixel units in a pixel island are same; and the display panel comprises a plurality of pixel islands, and the plurality of pixel islands at least comprise a first pixel island for displaying a first color and a second pixel island for displaying a second color.

9. A display device, comprising the display panel according to claim 1, a microlens layer and a controller; wherein the microlens layer is disposed on a light emitting side of the display panel, the microlens layer comprises a plurality of microlenses corresponding to pixel islands of the display panel, and the microlens is configured to modulate emergent light of the pixel island in the display panel, to cause the pixel island to be mapped into a pixel array and realize image display; and the controller is connected with the display panel and configured to provide a drive signal for the display panel.

10. The display device according to claim 9, further comprising:

a camera arranged at a bezel area of the display device, wherein the camera is configured to photograph eyes of an user, to cause the controller to determine a focus area of the user on the display device according to a shot image, and drive the focus area and a non-focus area in the display panel to refresh at different refresh rates for image display.

11. A drive method based on the display device according to claim 9, comprising:

determining a focus area and a non-focus area of a user on the display device in real time; and driving the focus area to refresh at a first refresh rate for image display, and driving the non-focus area to refresh at a second refresh rate for image display, wherein the first refresh rate is higher than the second refresh rate.

12. The drive method according to claim 11, wherein the display device comprises a camera; and the determining the focus area and the non-focus area of the user on the display device in real time comprises:

controlling the camera to photograph eyes of the user in real time;

determining the focus area of the user on the display device according to a shot image; and determining a remaining area on the display device except the focus area as the non-focus area.

13. The drive method according to claim 11, wherein the driving the focus area to refresh at the first refresh rate for image display, and driving the non-focus area to refresh at the second refresh rate for image display, comprise:

driving sub-pixel units in the focus area to refresh a times; and driving sub-pixel units in the non-focus area to refresh b times;

wherein a and b are positive integers, and a is greater than b.

14. The drive method according to claim 11, wherein the driving the focus area to refresh at the first refresh rate for image display, and driving the non-focus area to refresh at the second refresh rate for image display, comprise:

driving sub-pixel units in the focus area to refresh c times; and driving the sub-pixel units in the focus area and sub-pixel units in the non-focus area to refresh d times;

wherein c and d are positive integers.

15. The drive method according to claim 13, wherein the driving sub-pixel units in the focus area to refresh comprises:

driving scanning signal lines corresponding to the focus area to sequentially transmit active level signals; and controlling control signal lines corresponding to the focus area to transmit a first signal, and controlling control signal lines corresponding to the non-focus area to transmit a second signal; and the driving sub-pixel units in the non-focus area to refresh comprises:

driving scanning signal lines in the display panel to sequentially transmit active level signals; and while sub-pixel unit rows corresponding to the focus area are scanned, controlling the control signal lines corresponding to the focus area to transmit the second signal, and controlling the control signal lines corresponding to the non-focus area to transmit the first signal.

* * * * *

UNITED STATES PATENT AND TRADEMARK OFFICE
CERTIFICATE OF CORRECTION

PATENT NO. : 12,154,496 B2  
APPLICATION NO. : 18/270850  
DATED : November 26, 2024  
INVENTOR(S) : Shaolei Zong et al.

Page 1 of 1

It is certified that error appears in the above-identified patent and that said Letters Patent is hereby corrected as shown below:

On the Title Page

Item (72) The inventors should read: Shaolei ZONG, Beijing (CN); Jigang SUN, Beijing (CN); Rui LIU, Beijing (CN); Xin DUAN, Beijing (CN); Wei SUN, Beijing (CN); Junwei ZHANG, Beijing (CN); Hongrun WANG, Beijing (CN); Fuqiang LI, Beijing (CN); Changfeng LI, Beijing (CN); Hui ZHANG, Beijing (CN); Xue DONG, Beijing (CN)

Signed and Sealed this  
Thirty-first Day of December, 2024

Derrick Brent  
*Acting Director of the United States Patent and Trademark Office*